W. C. SCHUELER.
AUTOMATIC OILING DEVICE FOR CROSS HEADS.
APPLICATION FILED FEB. 11, 1910.
1,000,554.
Patented Aug. 15, 1911.
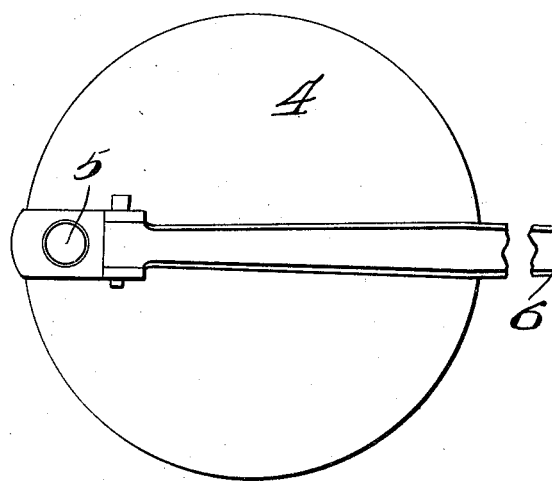
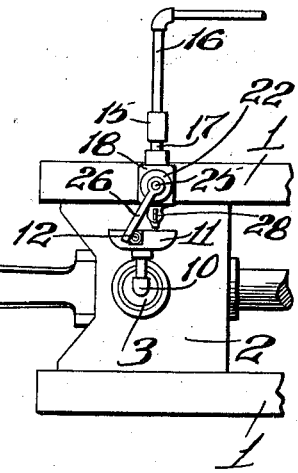
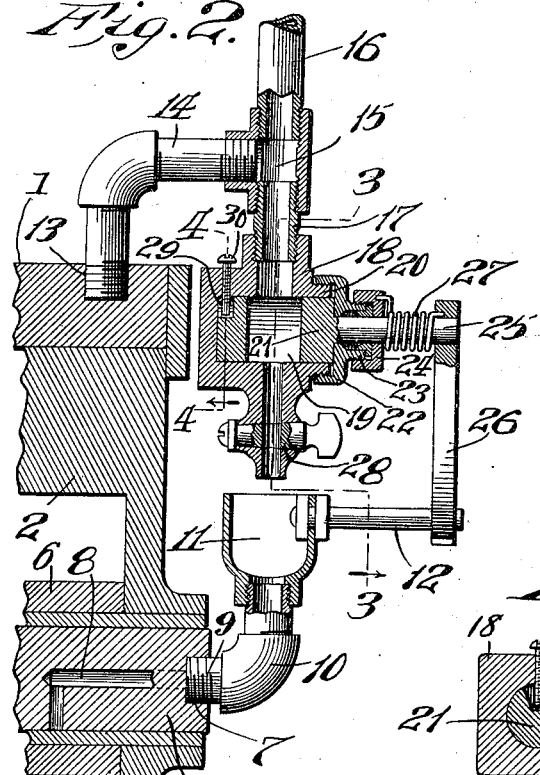
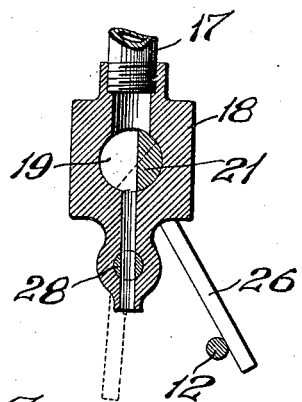
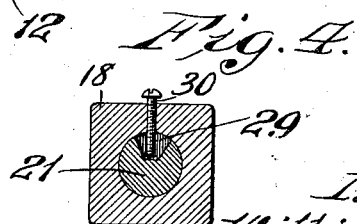
Inventor:
William C. Schueler.
By Higdon & Longan
Attys.

UNITED STATES PATENT OFFICE.

WILLIAM C. SCHUELER, OF YORK, PENNSYLVANIA.

AUTOMATIC OILING DEVICE FOR CROSS-HEADS.

1,000,554.  Specification of Letters Patent.  Patented Aug. 15, 1911.

Application filed February 11, 1910. Serial No. 543,308.

*To all whom it may concern:*

Be it known that I, WILLIAM C. SCHUELER, a citizen of the United States, and resident of York, Pennsylvania, have invented certain new and useful Improvements in Automatic Oiling Devices for Cross-Heads, of which the following is a specification containing a full, clear, and exact description, reference being had to the accompanying drawings, forming a part hereof.

My invention relates to improvements in automatic oiling devices for crossheads, the object of my invention being to construct a valve which is in communication with a source of supply of lubricating oil and which is arranged to be fixed to a stationary part of an engine or the like and arranged to be operated at times by a part carried by the crosshead for opening the valve to supply a quantity of lubricating oil to the cup or boat carried by the crosshead pin.

For the above purposes my invention consists in certain novel features of construction and arrangement of parts as will be hereinafter more fully described, pointed out in the claim and illustrated by the accompanying drawing, in which:

Figure 1 is an elevation illustrating my improved oiling device as applied for use in connection with a stationary engine and, as shown, the valve is in an open position ready to discharge a quantity of lubricating oil into the cup carried by the crosshead pin; Fig. 2 is an enlarged, vertical, sectional elevation of the complete oiling device; Fig. 3 is a vertical, sectional elevation taken on the line 3—3 of Fig. 2; and Fig. 4 is a vertical, sectional elevation taken on the line 4—4 of Fig. 2.

Referring by numerals to the accompanying drawing: 1 designates the crosshead guides, 2 the crosshead, 3 the crosshead pin, 4 a balance disk, 5 a wrist pin carried by the disk and 6 the connecting rod between the wrist pin 5 and crosshead pin 3. All of the above parts are or may be of ordinary construction.

The outer end of the crosshead pin 3 is provided with a screw seat 7 which is in communication with the oil chamber 8 formed in the crosshead pin.

9 designates a nipple which is threaded in the screw seat 7 and which is connected with an elbow 10.

11 designates an oil cup or boat supported by the elbow 10 and is or may be of ordinary construction. Carried by the cup 11 is a pin 12 which projects outwardly from the cup.

At a point in the upper face of the upper crosshead guide, approximating a line drawn vertically from the center of the crosshead pin when at its outer limit of movement, is a screw seat 13 into which screw seat is seated an L-shaped nipple 14 threaded at both of its ends. Carried by the upper end of the nipple 14 is a T-coupling 15, to the upper end of which is threaded a pipe 16 leading from a source of oil supply (not shown). Threaded to the lower extension of the T-coupling 15 is a nipple 17 and secured to the nipple and suspended therefrom is a valve-housing 18. Formed within the housing 18 is a chamber 19 circular in cross section throughout its length and of a lesser length than the valve-housing. Formed integral with the valve-housing 18 is an annular threaded extension 20. A valve 21 is seated in the chamber 19 and is held against longitudinal movement by means of the cap 22 screwed on the extension 20. Formed integral with the cap 22 is a threaded extension 23 and threaded to the extension 23 is a stuffing nut 24.

25 designates the stem of the valve which is formed integral with the valve and projects outwardly beyond the nut 24. Carried by the outer end of the valve stem is a lever 26 which is secured against rotary movement relative the valve stem. Embracing the stem between the lever 26 and the nut 24 is a convolute spring 27, one end of which is seated in an opening formed in the nut 24 and the opposite end seated in an opening formed in the lever 26, which spring is designed to normally hold the valve in a closed position in which the lever 26 extends substantially vertically.

Formed integral with the valve-housing 18 and on the lower face thereof is an ordinary drip-cock 28, the opening through which communicates with the chamber 19.

To limit the rotary movement of the valve 21 within the housing 18, a cavity 29 is formed in the inner end of the valve, the walls of which are radial and inserted through a threaded opening formed in the housing 18 and projecting into the cavity 29 is a threaded pin 30.

In practical operation and assuming the parts are in position as shown in Fig. 1 of the drawing, the pin 12 which is carried by the cup 11 secured to the crosshead pin 3, contacts with the lever 26 at a point approximately at the point, which is the end of stroke of the crosshead. Thus the valve 21 is opened and a quantity of oil is fed to the cup 11 through the drip-cock 28. By reason of the spring 27 the valve is closed after the pin 12 is drawn away from contact with the lever 26. By such a construction and arrangement of parts, it is obvious that a small quantity of oil will be supplied to the cup 11 at the end of each full stroke of the crosshead.

Heretofore, it has been the practice to position a lubricating device at or about the same point where I position my lubricator and permit the lubricator to flow constantly, thus, as the cup, carried by the crosshead pin, was underneath the lubricator the cup received a small quantity of oil. During the balance of the movement of the cup throughout the full stroke of the crosshead the oil that flowed from the lubricator was lost or wasted or at least it did not enter the crosshead cup and be utilized as a lubricant for the crosshead pin.

While I have shown and described my improved lubricator as applied for lubricating a crosshead pin, it is obvious that with slight modifications the same could be utilized to lubricate the connection between the opposite end of the connecting rod and the wrist pin of the balance disk, or the same may be applied to various other traveling or moving parts of machinery.

I claim:

In a lubricator of the class described, a valve casing fixed to a stationary part of an engine, the casing being in communication with a source of lubricant supply, a valve operating in said casing, a spring for normally holding the valve in a closed position, a lever depending from the stem of the valve, a second valve for controlling the flow of lubricant released by the first mentioned valve, a movable part of the engine to be lubricated, an open-topped cup having greater length than breadth and disposed lengthwise relative the line of travel of said movable part of the engine, and a lateral projection carried by said cup and arranged for engagement at times with the lever depending from the stem of the first mentioned valve.

In testimony whereof, I have signed my name to this specification, in presence of two subscribing witnesses.

WILLIAM C. SCHUELER.

Witnesses:
E. E. LONGAN,
E. L. WALLACE.

Copies of this patent may be obtained for five cents each, by addressing the "Commissioner of Patents, Washington, D. C."